(12) United States Patent
Steblau

(10) Patent No.: US 9,856,915 B2
(45) Date of Patent: Jan. 2, 2018

(54) RADIAL CAGE FOR BEARINGS HAVING HIGH ROTATIONAL SPEEDS

(71) Applicant: Dieter Steblau, Schweinfurt (DE)

(72) Inventor: Dieter Steblau, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/177,415

(22) Filed: Jun. 9, 2016

(65) Prior Publication Data

US 2016/0363166 A1    Dec. 15, 2016

(30) Foreign Application Priority Data

Jun. 9, 2015   (DE) .......................... 10 2015 210 571

(51) Int. Cl.
*F16C 33/46*    (2006.01)
*F16C 19/26*    (2006.01)

(52) U.S. Cl.
CPC ............ *F16C 33/467* (2013.01); *F16C 19/26* (2013.01); *F16C 33/4623* (2013.01); *F16C 33/4676* (2013.01); *F16C 2240/30* (2013.01); *F16C 2300/22* (2013.01)

(58) Field of Classification Search
CPC .... F16C 19/26; F16C 33/467; F16C 33/4623; F16C 33/4676; F16C 2240/30; F16C 2300/22
USPC ................. 384/548, 572, 565, 575, 578, 580
See application file for complete search history.

(56) References Cited

U.S. PATENT DOCUMENTS

| | | | | |
|---|---|---|---|---|
| 3,310,351 A  * | 3/1967 | Ortegren | ............... | F16C 19/463 384/575 |
| 3,477,773 A  * | 11/1969 | Altson | .................. | F16C 19/364 384/576 |
| 4,462,643 A  * | 7/1984 | Gilbert | .................. | F16C 19/364 384/548 |
| 5,391,005 A  * | 2/1995 | Alling | ..................... | F16C 19/48 384/572 |
| 8,382,380 B2 * | 2/2013 | Nakamizo | ............. | F16C 19/364 384/564 |

(Continued)

FOREIGN PATENT DOCUMENTS

| | | | | |
|---|---|---|---|---|
| DE | 102006004754 A1 * | 8/2007 | ............. | B21D 53/12 |
| EP | 1262256 A1 * | 12/2002 | ............. | B21D 53/12 |

(Continued)

*Primary Examiner* — Marcus Charles
(74) *Attorney, Agent, or Firm* — Bryan Peckjian; SKF USA Inc. Patent Dept.

(57) ABSTRACT

A radial cage for receiving and guiding cylindrical rolling elements includes first and second axially spaced side rings and a plurality of axial bridges therebetween, the axial bridges defining a plurality of pockets for receiving the cylindrical rolling elements. Each of the plurality of axial bridges includes a first axial side section connected to the first side ring and a second axial side section connected to the second side ring and a center axial section, and the center axial section is connected to the first side section via a first oblique intermediate section and to the second side section via a second oblique intermediate section, and the first axial side section includes a first region having a first material thickness and a second region having a second material thickness greater than the first material thickness.

18 Claims, 2 Drawing Sheets

(56) References Cited

U.S. PATENT DOCUMENTS

| | | | |
|---|---|---|---|
| 8,714,833 B2 * | 5/2014 | Fugel | B21D 53/12 384/572 |
| 2009/0003751 A1 * | 1/2009 | Auffahrt | F16C 33/6681 384/575 |
| 2009/0215583 A1 * | 8/2009 | Urakami | F16C 3/02 475/348 |
| 2010/0322549 A1 * | 12/2010 | Brown | F16C 33/546 384/572 |

FOREIGN PATENT DOCUMENTS

| | | | | | |
|---|---|---|---|---|---|
| EP | 2623803 | A1 * | 8/2013 | | F16C 33/46 |
| JP | 2002364651 | A * | 12/2002 | | B21D 53/12 |
| JP | 2009115300 | A * | 5/2009 | | F16C 33/541 |
| JP | 2011080503 | A * | 4/2011 | | F16C 33/546 |
| WO | WO-2009136532 | A1 * | 11/2009 | | F16C 33/546 |

* cited by examiner

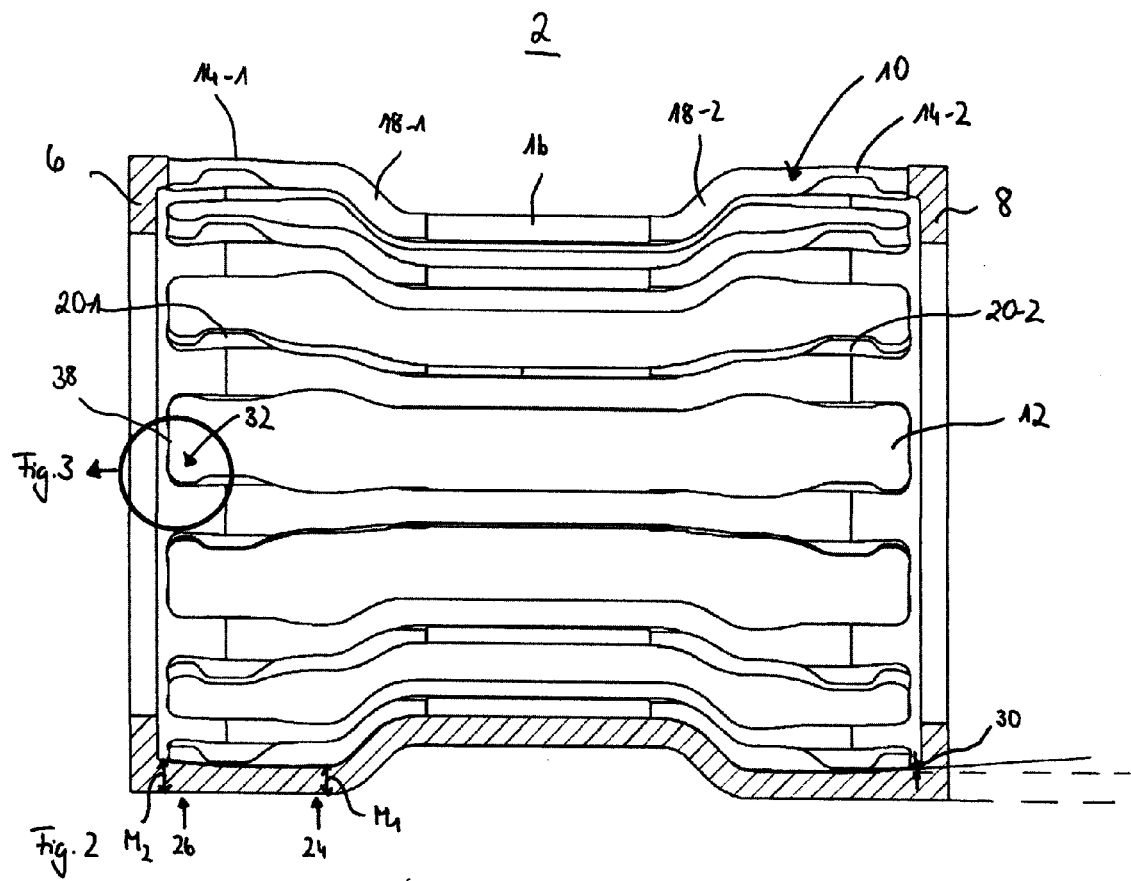
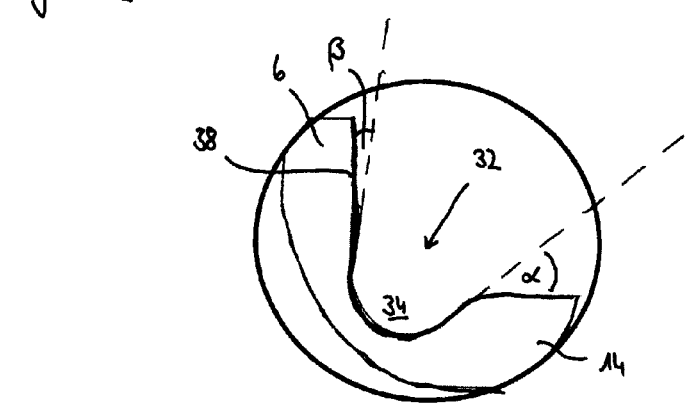
Fig. 3

RADIAL CAGE FOR BEARINGS HAVING HIGH ROTATIONAL SPEEDS

CROSS-REFERENCE

This application claims priority to German patent application no. 10 2015 210 571.7 filed on Jun. 9, 2015, the contents of which are fully incorporated herein by reference.

TECHNOLOGICAL FIELD

The present disclosure is directed to a radial cage for receiving and guiding cylindrical rolling elements, in particular to a needle roller cage that includes at least two side rings and a plurality of axial bridges connected to the side rings and defining pockets for the rolling elements.

BACKGROUND

Radial cages, or needle roller and cage assemblies including radial cages, are well suited for high rotational speeds. Such assemblies are often used in planetary transmissions, which due to the high rotational speeds at which they operate, place high demands on the installed needle roller and cage assemblies. Needle roller and cage assemblies of this type usually include a radial cage and of a plurality of needle rollers received in the radial cage and are distinguished in particular by a smallest-possible radial installation height. At the same time, however, needle roller and cage assemblies can absorb high centrifugal forces and high acceleration forces and thus have a high load-bearing capacity and a high running accuracy.

A radial cage for a needle roller and cage assembly of this type is usually comprised of two side rings defining an axial extension of the radial cage. A plurality of generally axial bridges connect these side rings to each other, which axial bridges form or define pockets for receiving the needle rollers. In order to achieve low cage distortion or deformation even at high rotational speeds, the axial bridges are each formed by two axially straight side sections connected to the side rings, and by two intermediate sections extending obliquely with respect to the cage longitudinal axis, and by an axial center section. This stepped design is intended to reduce the effect of centrifugal forces on the cage and makes it possible for the needle rollers to be held by the axial bridges in the radial cage.

Disadvantageously, however, at very high rotational speeds, the bridges of these cages may break in the region of the straight side sections of the axial bridges. This is because the radial cage is stressed by the intermittent extremely high centrifugal forces such that the axial bridges bend radially outward due to their own mass. This deformation in turn leads to an undesired contact between radial cage and needle rollers, which in turn results in an increase in friction and a removal of the lubricant film. The service life and durability of the bearing are thereby significantly reduced. In addition, in particular when additional axial loads are applied to the bearing, the required low installation height can lead to the necessarily thin needle rollers being overrolled from the bearing cage into the region of the side rings. This can cause a total failure of the bearing.

SUMMARY

One aspect of the present disclosure is therefore to provide a radial cage for bearings having high rotational speeds that also provides a good guiding of the components without an increase in friction or removal of lubricant film, even in the event of high dynamic loads.

In the following description a radial cage, in particular a needle roller cage, is disclosed for receiving and guiding cylindrical rolling elements whose rotational axes define a pitch circle. This radial cage includes at least two side rings axially spaced from each other and defining an axial extension of the bearing cage, and a plurality of generally axial bridges connecting the side rings to each other. A plurality of pockets for receiving the cylindrical rolling elements is formed between the axial bridges, and the axial bridges each include two side sections connected to the side rings and extending essentially parallel to the axial extension and a center section extending substantially parallel to the axial extension. The center section is connected to the side sections via two intermediate sections that extend obliquely with respect to the bearing axis. It is particularly advantageous if the center section is disposed radially within the pitch circle, while the side sections are disposed radially outside the pitch circle, so that the rolling elements received in the pockets are secured against falling out either inward or outward.

To prevent an overrolling of the rolling elements, in particular in the event of high speeds and/or an axial tilt of the rolling element, the side section is configured such that in a first region of the side section a first material thickness is provided, and in a second region of the side section a second material thickness is provided that is greater than the first material thickness. Here this increase of the material thickness is preferably a radial increase in thickness, and it can thus be ensured that even with high speeds and/or a tilting occurring over the longitudinal axis of the rolling element an overrolling of the bearing cage over the rolling elements does not occur. At the same time the greater material thickness makes it possible for the guiding of the rolling elements to be generally improved so that undesired contact between the rolling elements and the cage, in particular with the axial bridges of the cage, is reduced. This in turn helps ensure that no increase in friction or lubricant film removal occurs.

It may be particularly advantageous if the region having the greater material thickness is formed at a transition from the side section to the side ring. It is in this region, namely the end region of the pocket, that, in the event of a tilting, an overrolling of the rolling elements can occur particularly easily due to axial loading of the bearing. The greater radial material thickness of the bridge can prevent the rolling elements from being overrolled by the bearing cage, particularly at the pocket end.

In contrast, the region having the first material thickness is preferably disposed at a transition from the side section to the intermediate section. Here the first material thickness can advantageously correspond to a material thickness in the center section, however it is also possible to configure the first material thickness greater than a material thickness in the center section. If the material thickness in the center section is reduced in comparison to the material thickness in the first section, then this has the advantage that centrifugal forces in the center section of the axial bridge are significantly reduced, so that a deflecting of the axial bridge at high rotational speeds can be prevented.

According to a further advantageous exemplary embodiment a transition from the first material thickness to the second material thickness occurs essentially uniformly. A uniform transition of this type can in particular be provided in a simple manner by the rolling process usually used for the manufacturing of the bearing cage. It is particularly advantageous here if the transition from the first material thickness to the second material thickness follows, at least in a partial region, a linear and/or exponential and/or logarithmic function. Transition curves of this type be easily provided by the rolling process and offer advantageous designs of the radially inner-lying side-section curve, which leads to a good and secure guiding of the rolling elements even with high loads.

According to a further advantageous exemplary embodiment an undercut is provided pocket-side in a transition from at least one of the side sections to the side ring connected thereto, which undercut forms a pocket corner. This undercut makes possible a particularly low-wear guiding of the rolling elements in the pocket, since a guiding of the rolling elements along the side ring and along the guide surfaces formed on the axial bridges is thereby optimized. If the rolling elements in the region of the pocket corners were to directly fill in the pocket corners, this would easily lead to a jamming and to an increased wear both of the bearing cage and of the rolling elements.

It is particularly advantageous here if the undercut is formed both on the side section and on the side ring. In particular, due to the forming on the side ring it can be achieved that the rolling element does not roll flatly on the side ring but rather in the region of a central guiding surface, so that on the one hand the rolling element is guided in as low-friction a manner as possible, and on the other hand it is ensured that lubricant can also enter into a region of the rolling-element end side.

It has been shown in particular here that an opening angle of the undercut that is between approximately 35° and 45° wide in the region of the axial bridge, and/or an opening angle of the undercut that is between approximately 1° and 5° wide in a region of the side ring, are particularly preferable.

Further advantages and advantageous embodiments are shown in the claims, the description, and the drawings. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the appended claims.

BRIEF DESCRIPTION OF THE DRAWINGS

FIG. 2 shows a schematic sectional view through the radial cage of the needle bearing from FIG. 1.

FIG. 3 shows an enlarged view of a pocket edge of the radial cage depicted in FIG. 2.

DETAILED DESCRIPTION

Figure 1:
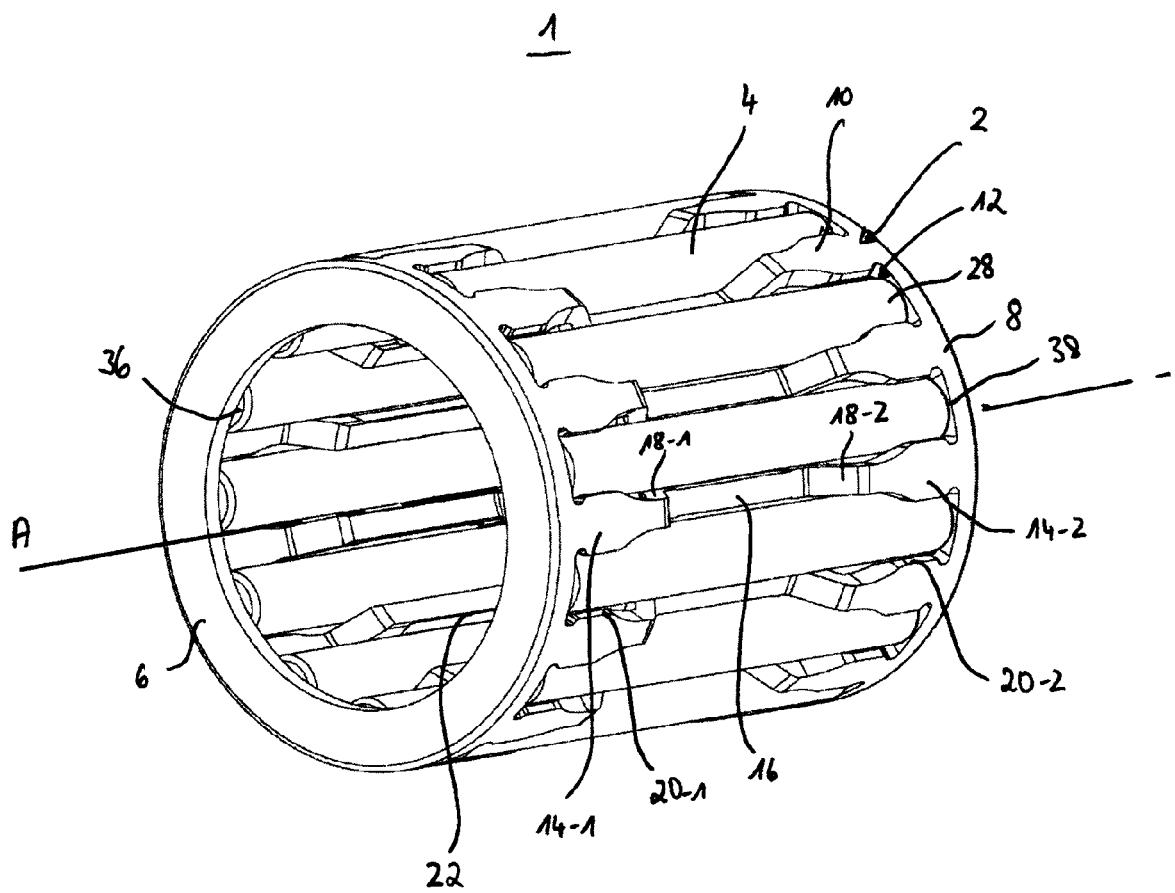
FIG. 1 shows a schematic spatial depiction of a needle roller and cage assembly.

In the following, identical or functionally equivalent elements are designated by the same reference numbers.

FIG. 1 schematically shows a spatial view of a needle roller and cage assembly 1 including a radial cage 2 and rolling elements 4 supported in the radial cage 2. The radial cage 2 further includes a first and a second side ring 6, 8 that are disposed axially spaced from each other and are connected to each other via generally axial bridges 10 such that pockets 12 for receiving the rolling elements 4 are formed between the axial bridges. As can be seen in the single view of the radial cage of FIG. 2, in addition to in the view in FIG. 1, the axial bridges themselves include side sections 14-1, 14-2, which are connected to the side rings 6, 8. Furthermore, the axial bridges 10 include a center section 16, which is connected to the side sections 14-1, 14-2 via lateral intermediate sections 18-1, 18-2. Here the side sections 14-1, 14-2 and the center section 16 extend essentially axially, while the intermediate sections 18-1, 18-2 extend obliquely with respect to a rotational axis A of the bearing 1.

The rolling elements 4 are secured against an outward or inward falling-out via retaining tabs 20-1, 20-2, 22, which are disposed on the side sections 14-1, 14-2 or on the center section 16.

Furthermore the side view of FIG. 2 shows that the material thicknesses of the axial bridges 10 change. Thus FIG. 2 shows that at its side sections 14-1, 14-2 the bearing cage 2 has a first material thickness M1 in a first region 24 and has a second materials strength M2 in a second region 26, wherein the second material thickness M2 is radially greater in comparison to the first material thickness M1. This material thickness M2 that increases radially inward in the second region 26 of the side section 14 helps ensure that rolling elements 4 that are disposed in the pockets 12 cannot be overrolled by the bearing cage 2 even in the event of a tilting over their longitudinal axes. The risk of overrolling always exists when, for example, a large axial load results in a misalignment of the rolling-element axis with respect to the bearing cage axis. In the event of such misalignments it can happen that the rolling element 4 jams on a radially-inward-tilting end 28 (see FIG. 1) on the axial bridge 10, which can lead to a locking of the bearing 1. Due to the greater radial material thickness M2 in the second region 26 of the side region 14, increased support 30 (see FIG. 2) for the rolling elements can be provided so that even in the event of extreme tilting they cannot be overrolled by the bearing cage 2.

Here a material thickening on the order of 10 to 20% or even greater is advantageous.

Furthermore, FIG. 2, and in particular the enlarged depiction of FIG. 3, show that the radial cage 2 also has a novel pocket-edge design. A pocket edge 32 is provided between the transition from the side section 14 to the side ring 6; 8. Here the pocket edge 32 is configured as an undercut so that a rolling element 4 disposed in the pocket cannot jam on its cylinder ends in the pocket edges 32. Here as can be seen in particular in FIG. 3, the undercut is chosen such that an opening angle α of the undercut 34 with respect to the side section 14 is chosen to be as large as possible. It has been shown that, for example, an opening angle of 35° to 45° is particularly advantageous. In addition, at the transition to the side ring 6 the undercut also has an opening angle β so that the rolling element 4 does not contact the side ring 6 along its entire end surface 36 (see FIG. 1), but only in a region 38 (see FIGS. 1, 2 and FIG. 3). It can thereby be ensured that the rolling element 4 shows particularly good rolling properties. It can simultaneously be ensured that a lubricant that is present in the pocket corner can be can be drawn in between the rolling element 4 and the side section 14 or the rolling-element end side 36 and the side ring 6, so that the rolling element 4 is reliably surrounded by lubricant. A bearing failure due to a lubricant-film removal can thus be reliably prevented.

In summary, a bearing cage is provided that finds use in particular in needle roller and cage assemblies that are subjected to high rotational speeds. Here even with local stress peaks and deformations, due to the increased thickness in the region between the side section and side ring it can be ensured that an overrolling or a jamming in general of the rolling element in the bearing can be prevented. In addition, the novel pocket corner helps improve lubricant availability to the rolling elements, even in an edge region, such that a lubricant-film removal and an increase in friction are prevented. Thus a bearing can be provided that has an improved axial guiding of the rolling elements as well as an increased durability.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Needle roller and cage assembly
2 Bearing cage
4 Rolling elements
6, 8 Side ring
14 Side section
16 Center section
18 Intermediate section
20, 22 Retaining tabs
24 First region having a first material thickness
26 Second region having a second material thickness
M1 First material thickness
M2 Second material thickness
28 Edge-side region of the rolling element
30 Material-strengthening thickness
32 Pocket corner
34 Undercut
36 Contact region of the rolling element along the side ring
38 Edge surface of the rolling element
A Axis of rotation

What is claimed is:

1. A radial cage for receiving and guiding cylindrical rolling elements, the cage including a first side ring and a second side ring axially spaced from the first side ring, the first and second side rings defining an axial extension of the radial cage, the cage further including a plurality of axial bridges connecting the first side ring to the second side ring, and the axial bridges defining therebetween a plurality of pockets for receiving the cylindrical rolling elements, wherein each of the plurality of axial bridges includes a first axial side section connected to the first side ring and a second axial side section connected to the second side ring and a center axial section, wherein the center axial section is connected to the first axial side section via a first oblique intermediate section and to the second axial side section via a second oblique intermediate section; and wherein the first axial side section includes a first region having a first material thickness and a second region having a second material thickness that is greater than the first material thickness.

2. The radial cage according to claim 1, wherein the first material thickness is a radial thickness.

3. The radial cage according to claim 1, wherein the second region is disposed at a transition from the first axial side section to the first side ring.

4. The radial cage according to claim 1, wherein a transition from the first material thickness to the second material thickness occurs in a uniform manner.

5. The radial cage according to claim 1, wherein the transition from the first material thickness to the second material thickness is at least partially exponential.

6. The radial cage according to claim 1, wherein the transition from the first material thickness to the second material thickness is at least partially logarithmic.

7. The radial cage according to claim 1, wherein the second material thickness is from 10% to 20% greater than the first material thickness.

8. The radial cage according to claim 7, wherein the undercut extends into the first axial side section and into the first side ring.

9. The radial cage according to claim 7, wherein an opening angle ($\alpha$) of the undercut in the region of the axial bridge is between 35° and 45°.

10. The radial cage according to claim 1, wherein an undercut facing a pocket is provided in a transition region from the first axial side section to the first side ring, the undercut forming a pocket corner.

11. The radial cage according to claim 9, wherein an opening angle ($\beta$) of the undercut in a region of the side ring is between 1° and 5°.

12. The radial cage according to claim 1,
wherein the first material thickness is a radial thickness,
wherein the second region is disposed at a transition from the first axial side section to the first side ring,
wherein a transition from the first material thickness to the second material thickness occurs in a uniform manner,
wherein the second material thickness is from 10% to 20% greater than the first material thickness,
wherein an undercut facing a pocket is provided in a transition region from the first axial side section to the first side ring, the undercut forming a pocket corner,
wherein the undercut extends into the first axial side section and into the first side ring,
wherein an opening angle ($\alpha$) of the undercut in the region of the axial bridge is between 35° and 45°, and
wherein an opening angle ($\beta$) of the undercut in a region of the side ring is between 1° and 5°.

13. A radial cage configured to receive and guide cylindrical rolling elements, the cage comprising:

a first side ring, a second side ring axially spaced from the first side ring, and a plurality of bridges connecting the first side ring to the second side ring and defining a plurality of pockets for receiving the cylindrical rolling elements, wherein each of the plurality of bridges includes a first axial side section connected to the first side ring and a second axial side section connected to the second side ring and a center axial section, wherein the center axial section is connected to the first side section via a first oblique intermediate section and to the second side section via a second oblique intermediate section; and wherein a radial thickness of the first axial side section at a junction of the first side ring and the first axial side section is greater than a radial thickness of the first axial side section at a junction of the first oblique intermediate section and the first axial side section.

14. The radial cage according to claim 13, wherein a change in the radial thickness of the first axial side section from the junction of the first side ring and the first axial side section to the junction of the first oblique intermediate section and the first axial side section is at least partially linear.

15. The radial cage according to claim 13, wherein a change in the radial thickness of the first axial side section from the junction of the first side ring and the first axial side section to the junction of the first oblique intermediate section and the first axial side section is at least partially exponential.

16. The radial cage according to claim 13, wherein a change in the radial thickness of the first axial side section from the junction of the first side ring and the first axial side section to the junction of the first oblique intermediate section and the first axial side section is at least partially logarithmic.

17. The radial cage according to claim 13, wherein the radial thickness at the junction of the first side ring and the first axial side section is 10% to 20% greater than the radial thickness at the junction of the first oblique intermediate section and the first side section.

18. The radial cage according to claim 13, wherein an undercut facing a pocket is provided at the junction of the first side ring and the first axial side section, the undercut forming a pocket corner.

* * * * *